United States Patent [19]

Scanlon et al.

[11] Patent Number: 5,726,835
[45] Date of Patent: Mar. 10, 1998

[54] DISK DRIVE ACTUATOR COIL WITH REDUCED OUTGASSING CHARACTERISTICS

[75] Inventors: Susan G. Scanlon, Rochester; Gordon A. Harwood, Byron, both of Minn.

[73] Assignee: Western Digital Corporation, Irvine, Calif.

[21] Appl. No.: 687,663

[22] Filed: Jul. 26, 1996

[51] Int. Cl.[6] ............................................. G11B 5/55
[52] U.S. Cl. ............................................. 360/106
[58] Field of Search ........................... 360/97.01, 98.01, 360/105, 106

[56] References Cited

U.S. PATENT DOCUMENTS

| | | | |
|---|---|---|---|
| 4,321,426 | 3/1982 | Schaeffer et al. | 174/34 |
| 4,503,605 | 3/1985 | Buckley | 29/605 |
| 5,008,549 | 4/1991 | Crewe | 250/396 ML |
| 5,018,029 | 5/1991 | Ekhoff et al. | 360/69 |
| 5,148,071 | 9/1992 | Takahashi | 360/106 |
| 5,177,383 | 1/1993 | Sim | 310/13 |
| 5,305,169 | 4/1994 | Anderson et al. | 360/105 |
| 5,319,511 | 6/1994 | Lin | 360/105 |
| 5,341,259 | 8/1994 | Amirkiai et al. | 360/105 |
| 5,357,386 | 10/1994 | Haidari et al. | 360/92.02 |
| 5,452,162 | 9/1995 | Campbell et al. | 360/105 |
| 5,623,759 | 4/1997 | Thorson et al. | 29/603.04 |

OTHER PUBLICATIONS

H.P. Reid Co., Inc. Product Listing entitled "Precision, Custom Designed Magnet Wire", 2 pages, (date prior to Jul. 26, 1996).

*Primary Examiner*—Jefferson Evans
*Attorney, Agent, or Firm*—Leo J. Young, Esq.; Milad G. Shara, Esq.

[57] ABSTRACT

An actuator coil for a disk drive is formed of materials and processed in a manner such that the amount of outgassing that occurs in normal operation of the disk drive is minimized. An insulative coating, such as polyurethane which is rated well above the normal operating temperature is first applied to drawn copper wire. Then, a polyamide bond coating was used to cover the insulative coating. Next, a lubricant having a low average molecular weight was selected. The resulting wire was then wound to form the actuator coil. The coil is then cured at a high temperature for an extended length of time to drive off solvents and allow the polymers to crosslink and stabilize.

19 Claims, 1 Drawing Sheet

DISK DRIVE ACTUATOR COIL WITH REDUCED OUTGASSING CHARACTERISTICS

FIELD OF THE INVENTION

The present invention relates to disk drive actuator coils, and in particular to an actuator coil with improved outgassing characteristics.

BACKGROUND OF THE INVENTION

Hard disk drive storage devices have been used as a secondary storage device for computer systems for many years. They provide inexpensive, high capacity digital storage with the ability to quickly access data stored on the drive. A typical hard disk drive comprises a housing with one or more magnetic disks separated by spacers mounted on a motor driven spindle hub which in turn is supported on a base. Data is stored on the disks by changing the magnetization of small areas on the disks called domains. The domains are written and read by magnetic transducers mounted on the end of suspensions which are coupled to a rotary actuator positioned to one side of the disks. The rotary actuator has coils of wire placed adjacent to magnets such that current flow through the coils causes movement of the transducers radially over the surfaces of the disks. Data on the disks are written in substantially parallel concentric tracks, with information, called servo information designed to be detected by the transducers and used to control the radial position of the transducer so that it can move across tracks of data and follow a track of data.

One well known problem in disk drives is that heads which support the transducers will come into contact with the disk surface when the disks stop rotating. Typical disks rotate at between 6,000 to 8,000 revolutions per minute (RPM) and higher during operation, and the heads actually fly just about the surface of the disk. When power is turned off, the disks stop rotating, and the heads come to rest in contact with the disk. Special care is take to try to prevent the head from sticking to the disk. Disk lubricants are selected to help alleviate the problem. However, it is well known that some components of the disk drive will actually outgas, especially when subjected to heating. Some of the material outgassed has a tendency to condense on cool surfaces, such as disks. The outgassed material, especially organic material, will then cause heads at rest on the disk surface to stick. This stiction phenomena is well known, and there are great lengths taken to avoid it.

Some disk drive makers will actually pulse the spindle motor at the resonant frequency of the disks to provide an optimal force to "unstick" the heads. Others will pulse the actuator motor in a similar attempt. Such brute force methods can actually lead to damage of the highly sensitive delicate suspensions, heads and transducers currently in use. Other disk drive makers have used ramps and cams in an effort to lift the heads off the disk when the disk is at rest. These types of solutions have the problem of adding structural complexity and potentially generating catastrophic particles. One additional difficulty with lifting the heads off the disks is that there is no room left between the disks to allow the heads to be lifted off of them. In the push to build ever smaller and higher capacity disk drives, the distance between the disks has decreased so much that there is barely room for the head and suspension assemblies that hold the heads, much less room to lift them off the disks when desired.

Still further efforts have been made to select materials for suspensions which do not outgas stiction causing materials. The choice of proper adhesives has proven to be critical. Recirculating chemical filters have also been used to try to filter out contaminants, including outgassed materials. This type of solution is typically referred to as a bandage approach, and merely adds cost and complexity to the manufacture of disk drives. In some instances, the push for higher density drives has limited the amount of space available for such approaches.

It has only recently been determined that actuator coils, sometimes referred to as voice coils, are themselves a major contributor to stiction causing outgassing. Since the coils themselves are heat generators due to the current sent through them to cause movement of the heads from track to track, any materials in direct contact with them are subjected to some of the highest temperatures in the disk drive. At least one manufacturer has totally inclosed the coils in plastic. This adds to the height of the actuator assembly, and also adds to the weight, which in turn slows down the actuator. This is not a good thing to do, as fast access times are one of the key considerations in purchasing a disk drive.

There is a need for faster actuators in disk drives to decrease the access time to different tracks of data. This need is fueling the push to provide more powerful actuators. This in turn causes more heat to be generated in the coil, which leads to further outgassing. There is a need to reduce the stiction causing elements which condense on the disk surface without reducing the ability of the actuator to quickly seek tracks of data.

SUMMARY OF THE INVENTION

An actuator coil is formed of a core of conductive material having an insulator coating, a bondcoat and a lubricant which are selected to reduce outgassing when subjected to heat in a disk drive device. In one embodiment, the conductive material is copper clad aluminum, copper, or aluminum which is drawn from sheets of the material to form the core. The core is then coated with an insulator such as a polyurethane in a thermal class of about 155 C. or higher. The insulator layer is then coated with a bondcoat which comprises a polyamide that is temperature activated and rated approximately 150 to 180 C. Finally, a lubricant is applied, which has a low average molecular weight, such as Isopar M manufactured by Amoco.

The lubricant is helpful to ensure that the wire exhibits constant friction when it is wound into a coil in a standard manner. The coil is then cured at approximately 140 C. for four hours or longer to drive off solvents in the insulation and bondcoat and allow the polymers to crosslink and stabilize. The cure step, when done with the specific materials selected greatly reduces chemicals that would outgas during normal operation of the actuator in a disk drive, thus greatly reducing a major cause of head stiction.

Reducing the outgassing of the coil allowed the use of a lower resistivity coil. By reducing the resistivity by ⅓rd from 21 ohms to 14 ohms, more current could be driven through the coil. This however resulted in more power being dissipated, much of it in the form of heat. Since power is equal to the current squared times the resistance, increasing the current results in significantly more power being dissipated. Without the great reduction of outgassing of the coil, the power increase and resulting reduction in seek times would not have been feasible.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is defined by the appended claims.

Numbering in the Figures is usually done with the hundreds and thousands digits corresponding to the figure number, with the exception that the same components may appear in multiple figures.

Figure 1:
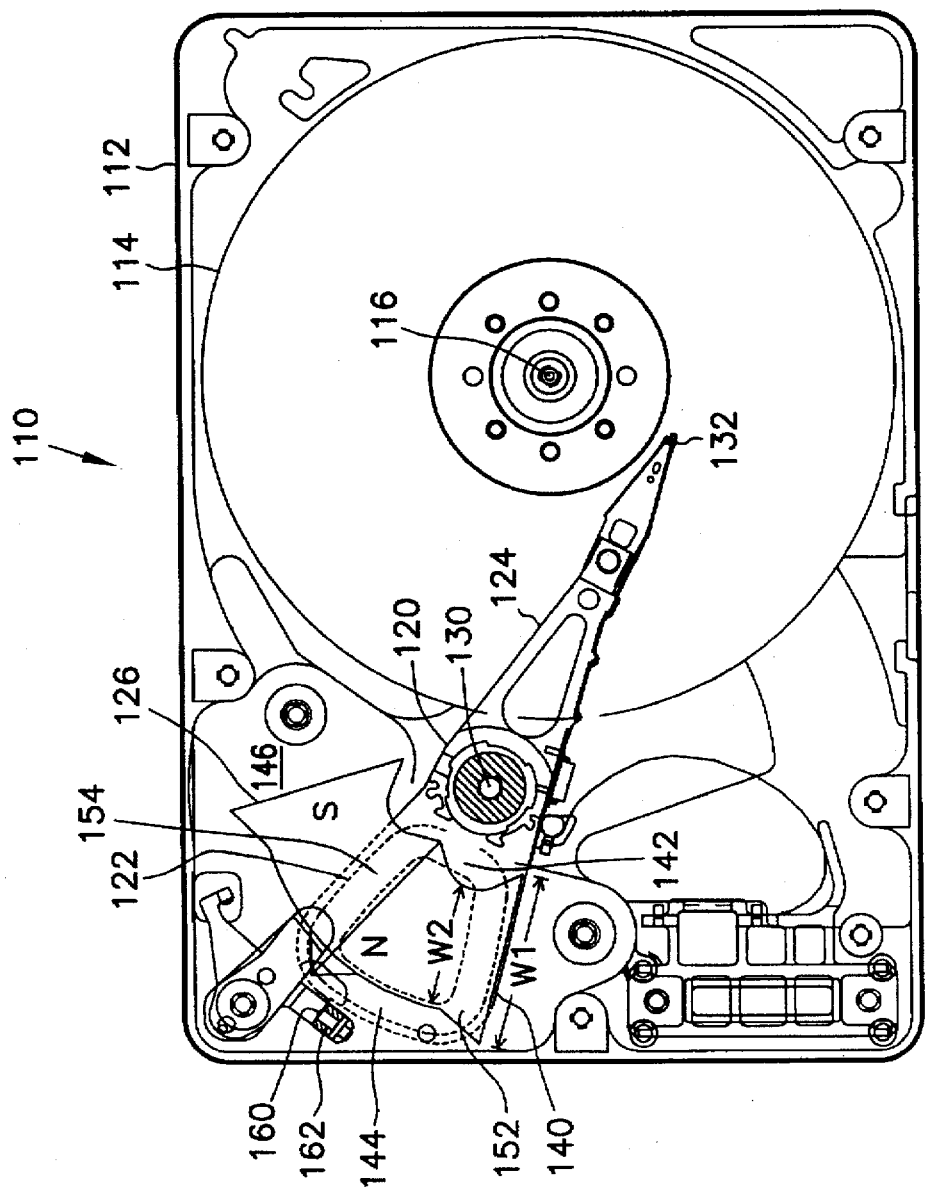
FIG. 1 is a top view of a disk drive device having an actuator coil formed in accordance with the present invention.

A disk drive in FIG. 1 is indicated generally at 110. A base plate 112 supports a plurality of stacked disks 114 via a spindle 116. The spindle 116 is driven by a motor which is not shown. Some motors are concentric within the spindle, to save space, while others are located directly on the base plate 112 beneath the disk stack 114. An actuator 120 comprises a voice coil 122, a comb suspension assembly 124 and a magnet structure 126. The voice coil 122 and magnet structure 126 combine to cause rotation of the actuator about an axis of rotation 130. Voice coil 122 and suspension assembly 124 are positioned opposite each other about the axis of rotation 130. In further embodiments, they need not be opposite, but only arranged so that the suspension moves about the disks to position a transducer assembly or head 132 over tracks of data written on the disks. The head is designed to either float above the tracks of data on a cushion of air in the common Winchester type of design, or to actually reside on or in a lubricant in the newer "near contact" recording type of designs. Other forms of transducer assemblies are also suitable.

The voice coil, 122 comprises a continuous strand of wire wound into a partial pie shaped coil having two tangential legs 142 and 144 coupled by two radial legs 152 and 154. The coil is injection molded into a pot comprising approximately 40% glass filled polyphenylene sulfide or equivalent to provide rigidity while remaining lightweight. The voice coil is then affixed to the actuator 120. A crash stop 160 is affixed to the outside of tangential leg 144 to rotate into contact a latch mechanism 162 which is retentively affixed to the base 112 in a position adjacent to the voice coil to prevent head 132 from rotating too far toward the spindle 116. The latch 162 comprises a permanent magnet in one embodiment, and the crash stop 160 is made of magnetic material such that the actuator is held in position by the magnetic attraction when they are in contact.

Figure 2:
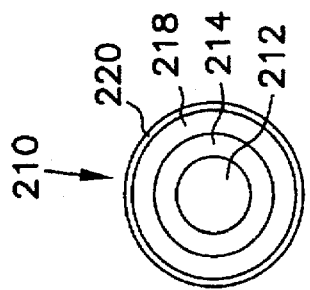
FIG. 2 is a cross section of a wire used to form the actuator coil of FIG. 1.

A wire for use in forming the voice coil 122 is shown generally in cross section at 210 in FIG. 2. 200 turns of wire are used, having a total resistance of approximately 14 ohms. The two ends of the wire are suitably coupled to a controller for providing current to the wire to cause the actuator 120 to move as desired. To greatly clean up residual organics, which are outgassed when current heats up the coil, materials were selected and processing of the wire was done to remove them prior to using the coil in a disk drive device.

The core 212 of the wire is preferably formed of copper clad aluminum, copper, aluminum, or other conductive material that can be wound into a coil without adversely affecting its conductive characteristics. It is drawn from sheets of the same material to about 0.19 mm in diameter as is well known in the art. A first coating of the wire is an insulator layer 214, followed by a bondcoat 218 and a lubricant 220. The insulator 214 is formed over the core by dripping the insulator material on it, or running the wire through a reservoir of insulation. The insulator 214 is designed to provide electrical insulative properties such that current is not conducted between adjacent cores. It is also desired that the insulator be solderable to make it easy to obtain electrical connections with the actuator controller. It is difficult to strip the insulation off the wire to form such connections, but it can be done if solderable materials are not used. In one embodiment, H.P. Reid Co., Inc. Poly, which is a polyurethane that is rated to 155 C. was used. This rating is well above the normal disk drive coil operating temperature specified at a maximum of 100 C. Higher rated insulators may also be used.

The bondcoat 218 selected is a polyamide called H.P. Reid Co., Inc. Bond-N which is temperature activated and rated 150 C. to 180 C. Other bondcoats higher in the thermal class, such as a Poly-Clad which is a polyester-polyimide, or Isonel 200® will also work, and can be processed at higher temperatures. The wire is then partially cured after application of the insulator and bondcoat in a known manner. It may also be cured after application of each such layer by running it via tension spools through curing ovens for a desired length of time. In any event, enough solvent must be left in the bond coat so that it will bond in coil form when cured as described below. In one embodiment, the wire is cured for an extended length of time beyond normal curing times to drive off more solvent. It still must have enough left to bond in coil form, but the extended cure helps to minimize outgassing of the coil when installed in a disk drive device.

Finally, the lubricant 220 is selected to provide good lubrication for a constant coefficient of friction during winding of the coil. This is an important trait to have in that variable friction induced aberrations in the winding process can make the wire much more difficult to wind and result in substantial defects in the coil. The lubricant 220 should either be very volatile but non-flammable ensure that most of it is driven off during subsequent processing steps prior to installation of the coil in the disk drive. That is why a low molecular weight lubricant was selected. In one embodiment, Isopar M manufactured by Amoco is used.

The lubricant is helpful to ensure that the wire exhibits constant friction when it is wound into a coil in a standard manner. Such a lubricant is easier to drive off during a coil curing step where the coil is heated to approximately 140 C. for about 4 hours. This cure process step drives off solvents in the insulation and bondcoat and allows polymers in the bondcoat to crosslink and stabilize. In other words, adjacent wires in the coil bond together. If the earlier wire cures in the wire manufacturing process were not timed properly, insufficient bonding will occur at this step. At lower temperatures, bonding does not occur as well. At significantly higher temperatures, the coils tended to warp. Longer cure times may also be used.

In an alternative embodiment, high molecular weight lubricants are used so that none of the lubricant is driven off during processing or normal drive operation.

Proper bonding is important in order to obtain consistent structural integrity in the coil. The coil must be formed and tightly bound such that there is no contact with the magnet in drive operation. An unbound or loosely bound coil can compromise servo performance by creating resonance within the coil. The net result is longer settling times and inability to remain on the track of data.

It is important that the coil only be subjected to specified operating temperatures. To accomplish this, the resistance of the coil is monitored as it is directly related to the temperature of the coil. When a predetermined resistance is reached, the number of operations per second is limited to reduce the overall current flow through the coil and hence reduce the temperature of the coil.

Several methods are used to determine the amount of outgassing occurring in the improved coils. A first, simple method involves weighing the coil, then subjecting the coil to current which induces desired temperatures. The weight loss of the coil is then measured. In one embodiment, the maximum weight loss specified is set at less than 500 micrograms. Another test involves operating the coil in the presence of a head/disk interface and using strain gauges on the suspension to measure friction and stiction. This test provides more direct evidence of the effects of outgassing on stiction.

In further embodiments, the resistance of the coil is designed to be less than 14 ohms, and the number of turns in the coil may also vary. Further, higher rated insulators and bondcoats may also be used. Other lubricants of low molecular weight may also be used. While Amoco Isopar M was initially selected, Isopar is available in low to high molecular weight to obtain similar advantages without departing from the invention.

What is claimed is:

1. A method of forming a voice coil for a disk drive actuator comprising the steps of:
    coating a conductive material with an insulator and a bondcoat;
    coating the bondcoat with a low molecular weight lubricant to form a lubricated wire;
    winding the lubricated wire into a coil of wire; and
    curing the coil of wire.

2. The method of claim 1 wherein the coil of wire is cured to substantially remove the lubricant.

3. The method of claim 2 wherein the coil of wire is cured to bond adjacent wires in the coil to each other.

4. The method of claim 3 wherein the coil of wire is cured at approximately 140 degrees C. for a minimum of 4 hours.

5. The method of claim 3 wherein the coil of wire is cured to drive off solvents in the insulator and the bondcoat.

6. The method of claim 1 wherein the insulator is rated to 155 C.

7. The voice coil of claim 6 wherein the insulator is a polyurethane.

8. The method of claim 1 wherein the bondcoat is temperature activated at 150 C. to 180 C.

9. The method of claim 8 wherein the bondcoat is Isopar lubricant.

10. The method of claim 9 wherein the bondcoat is Isopar M low molecular weight lubricant.

11. The method of claim 1 wherein the conductive material is cured following the coating with an insulator and bondcoat and prior to the coating with lubricant.

12. A voice coil for a disk drive actuator comprising:
    an insulated wire wound in a partial pie shaped coil and potted in a first material, wherein said wire comprises:
    a conductive core;
    an insulator affixed to the core;
    a bondcoat affixed to the insulator; and
    a low molecular weight lubricant coating the bondcoat, wherein solvents in the insulation and bondcoat have been substantially removed along with most of the lubricant.

13. The voice coil of claim 12 wherein adjacent wires in the coil are substantially bonded to each other.

14. The voice coil of claim 12 wherein the insulator is rated to 155 C.

15. The voice coil of claim 14 wherein the insulator is a polyurethane.

16. The voice coil of claim 12 wherein the bondcoat is temperature activated at 150 C. to 180 C.

17. The voice coil of claim 12 wherein the bondcoat is Isopar lubricant.

18. The voice coil of claim 17 wherein the bondcoat is Isopar M low molecular weight lubricant.

19. A disk drive comprising:
    a base;
    a disk rotatably coupled to the base;
    a suspension supporting a transducer for reading data written on the disk;
    an actuator rotatably coupled to the enclosure for moving the suspension to precisely position the transducer radially along the disk for reading the data, the actuator comprising a set of coils of wire, said wire comprising:
    a conductive core;
    an insulator affixed to the core;
    a bondcoat affixed to the insulator; and
    a low molecular weight lubricant coating the bondcoat, wherein solvents in the insulation and bondcoat have been substantially removed along with most of the lubricant, having multiple legs coupled to the suspension, and:
    a magnet supported adjacent the coils.

* * * * *